US006629099B2

(12) United States Patent
Cheng

(10) Patent No.: US 6,629,099 B2
(45) Date of Patent: Sep. 30, 2003

(54) PARALLELED CONTENT ADDRESSABLE MEMORY SEARCH ENGINE

(75) Inventor: Paul C. Cheng, San Jose, CA (US)

(73) Assignee: Integrated Silicon Solution, Inc., Santa Clara, CA (US)

( * ) Notice: Subject to any disclaimer, the term of this patent is extended or adjusted under 35 U.S.C. 154(b) by 235 days.

(21) Appl. No.: 09/733,231

(22) Filed: Dec. 7, 2000

(65) Prior Publication Data

US 2002/0073073 A1 Jun. 13, 2002

(51) Int. Cl.[7] .............................................. G06F 17/30
(52) U.S. Cl. ................................ 707/10; 707/6; 707/3
(58) Field of Search ............................. 707/10, 1–3, 6; 711/108; 365/49, 189.07, 230.01; 709/236

(56) References Cited

U.S. PATENT DOCUMENTS

| | | | | |
|---|---|---|---|---|
| 4,996,666 A | | 2/1991 | Duluk, Jr. ..................... 365/49 |
| 5,010,516 A | | 4/1991 | Oates ........................... 365/49 |
| 5,072,422 A | | 12/1991 | Rachels ........................ 365/49 |
| 5,517,441 A | | 5/1996 | Dietz et al. ................... 365/49 |
| 6,026,461 A | | 2/2000 | Baxter et al. .................. 707/8 |
| 6,052,683 A | | 4/2000 | Irwin .......................... 710/244 |
| 6,061,262 A | | 5/2000 | Schultz et al. ................. 365/49 |
| 6,253,280 B1 | * | 6/2001 | Voelkel ....................... 711/108 |
| 6,317,350 B1 | * | 11/2001 | Pereira et al. ................ 711/108 |
| 6,362,992 B1 | * | 3/2002 | Cheng .......................... 365/49 |
| 6,374,326 B1 | * | 4/2002 | Kansal et al. ................. 711/108 |
| 6,389,507 B1 | * | 5/2002 | Sherman ......................... 707/6 |
| 6,418,042 B1 | * | 7/2002 | Srinivasan et al. ............. 365/49 |
| 6,473,846 B1 | * | 10/2002 | Melchior ........................ 707/1 |
| 6,499,081 B1 | * | 12/2002 | Nataraj et al. ................. 365/49 |
| 6,526,474 B1 | * | 2/2003 | Ross ........................... 711/108 |

FOREIGN PATENT DOCUMENTS

WO          US01/31274      1/2002

OTHER PUBLICATIONS

Kobayashi, M. et al "A Longest Prefix Match Search Engine For Multi–Gigabit IP Processing", IEEE International Conference on Communications, vol. 3, pp. 1360–1364. 2000.*
Jon P. Wade and Charles G. Sodini; "A Ternary Content Addressable Search Engine," Aug. 1989; pp. 1003–1013; IEEE Journal of Solid–State Circuits, vol. 24, No. 4.*
Schultz, K.J.; Gulak, P.G.; "Fully parallel integrated CAM/RAM using preclassification to enable large capacities" Solid–State Circuits, IEEE Journal of , vol.: 31 Issue: 5 , May 1996 pp. 689–699.*
kenaga, T.; Ogura, T.;"A fully parallel 1–Mb CAM LSI for real–time pixel–parallel image processing"Solid–State Circuits, IEEE Journal of On pp: 536–544 vol: 35, Issue: 4, Apr. 2000.*
Music Semiconductors, Preliminary Data Sheet; MU9C1965A/L LANCAM MP, Oct. 1, 1998 Rev. 1a.
Music Semiconductors, Data Sheet; MU9C4320L ATM-CAM, Oct. 1, 1998 Rev. 2a.
SiberCore Technologies; SiberCam Ultra–2M, SCT2000.
Lara Networks, LNI7010 High Performance Search Engine.
Lara Networks, LNI7020 High Performance Search Engine.
* cited by examiner Primary Examiner—Diane D. Mizrahi
(74) Attorney, Agent, or Firm—Raymond E. Roberts; IPLO Intellectual Property Law Offices

(57) ABSTRACT

A parallel search engine able to receive commands via a search instruction input and data words via a search data input. The commands received, which are optionally programmable, control operation of a data dispatch unit and a result dispatch unit. The data words received are sent by the data dispatch unit as search data to a CAM module array made up of CAM modules interconnected by a cascade information bus for comparison against pre-stored comparand databases. The CAM modules of the CAM module array provide search results to the result dispatch unit which generates results, typically multiple in parallel, at a result output. Optionally, multiple of the parallel search engines may be cascaded by connection to an expansion bus to form a mega search engine.

21 Claims, 10 Drawing Sheets

PARALLELED CONTENT ADDRESSABLE MEMORY SEARCH ENGINE

TECHNICAL FIELD

The present invention relates generally to static information storage and retrieval systems, and more particularly to parallel data word search engines employing associative memories, which are also referred to as content addressable memory or tag memory.

BACKGROUND ART

Table lookup or database search functionality has been a common requirement which has desirably been implemented in hardware systems for many years. Though many such systems today require search functionality, this is particularly vital in high performance networks. Modem networks must have high performance search capability because they need to process high volumes of packet data, with each packet typically requiring many search operations. It is therefore imperative to improve the search capability if higher performance networks and search-based systems in general are desired.

For purposes of this discussion one can term the hardware unit used for table lookup or database search functionality a search engine. This search engine is the device or component that accepts data as input, searches that input data against a stored database, and returns a search result. Search engines are becoming very important in many applications that require high-speed lookup. For example, continuing with the network industry, switches and routers need to lookup the address field of incoming data packets in order to forward the packets to appropriate destinations. Advance network equipment also needs to lookup priority, service quality, and other fields of the packet in addition to the address field in order to service the packet with appropriate delivery quality. Data compression equipment needs to lookup data in order to find a compressed code for the data it replaces. These and other applications all demand high-speed lookup performance to keep up with ever-increasing requirements.

Content addressable memory (CAM) is increasingly used in such search engines today. It is a type of memory that accepts data as input and returns an address as its output. This is contrast to normal memory, which takes an address as an input and returns data stored at that address as an output.

FIG. 1 (background art) is a block diagram illustrating a conventional and very basic current CAM architecture. A typical CAM 1 contains three logic blocks: a CAM array block 2, a match detection block 3, and a priority encoder block 4. The CAM 1 receives a data input 5, a data sample often termed a "word" even though its size is not standard and in modem usage it is often quite long. The CAM array block 2 contains CAM cells and comparison logics, and a "database" of pre-stored content words which are potential matches with words that may be received as data inputs 5. When the CAM 1 receives a word at its data input 5 the CAM array block 2 processes this to produce sets of bit signals 6, one such bit signal 6 set for each content word compared against.

The match detection block 3 contains logics and sense amplifiers which determine from these sets of bit signals 6 if such a word being processed has any matches. The match detection block 3 produces a set of match signals 7, including one such match signal 7 for each content word (comparand) compared against.

The priority encoder block 4 contains logics to process the set of match signals 7 and to determine from it if any matches of a received word are indicated, and to pick among all such matches to establish one as having priority according to a pre-established rule. The CAM 1 then outputs the address of the highest priority match as a result output 8.

FIG. 2a (background art) is a block diagram illustrating a newer generation CAM 9, including four CAM modules 10. As was the case for the CAM 1 of FIG. 1, a data input 11 and a result output 12 are provided. Such newer generation CAMs 9 offer more flexibility for sample word "depth" and "width" configuration control. Instead of one big CAM array, multiple CAM modules 10 are placed on an integrated circuit (IC) and each CAM module 10 is able to support multiple configurations. The data input 11 and result output 12 accordingly support the depth and width of this.

FIG. 2b (background art) is a block diagram illustrating exemplary manners in which the CAM modules 10 in the newer generation CAM 9 of FIG. 2a might be configured to different depth and width. For example, each CAM module 10 of FIG. 2a arranged into a 8K×64 configuration 13, a 16K×32 configuration 14, or a 4K×128 configuration 15, as shown. Different configuration options like these are typically very useful, since applications tend to vary a lot and have different CAM width requirements. Unfortunately, even though the newer generation CAM 9 is more flexible than the older CAM 1, it shares the same basic architecture and can still only handle one search per clock cycle.

Currently, the best performance search functionality in network systems is implemented using CAM devices, as described above, and FIG. 3 (background art) is a block diagram illustrating this in a typical CAM-based network system 16. Here a network processor 17 (typically an application specific integrated circuit, ASIC) begins a search operation by moving data 18 to be searched to a CAM device 19, where a network information database has been prestored. A search result 20 is produced by the CAM device 19 and sent to a memory unit 21 (typically a static random access memory, SRAM), where an associate network database is stored. Finally, an associate result 22 travels back to the network processor 17 and the search operation is complete. This search cycle repeats several times for each data packet that is received, since multiple database searches are usually required per packet.

Various existing CAM devices, of course, currently exist and are in use. The MU9C4320L part by Music Semiconductors is a fixed 4 k×32-bit CAM. As such, it is a similar example of the art to that represented by FIG. 1 (background art). The SCT2000 part by SiberCore Technologies has a 2M CAM array is configurable to handle 36-bit, 72-bit, 144-bit and 288-bit entries. The LNI7010 and LNI7020 parts by Lara Networks are configurable to handle 34-bit, 68-bit, 136-bit and 272-bit entries. These are similar examples of the art to that represented in FIG. 2a (background art).

As noted above, current CAM devices, and in turn the search engines using them, have two major shortcomings. First, current search engine architecture permits very limited capability for configuring the width and depth of the CAM modules. This constraint causes bad resource utilization and increases the overall cost of systems using such CAM devices. Second, current search engine architecture can only support one search (accept one data input) per clock cycle. Since deep packet analysis, which is necessary in intelligent network systems, requires many searches per packet, it is beneficial for a search engine to support multiple searches per clock cycle. Accordingly, a different search engine architecture is needed.

DISCLOSURE OF INVENTION

Accordingly, it is an object of the present invention to provide a more powerful search engine, one which supports multiple search and lookup capabilities per clock cycle, in operating in parallel across multiple databases simultaneously.

Another object of the invention is to provide a search engine which provides better utilization, by providing finer control of the depth and width of embedded CAM resources.

And another object of the invention is to provide a search engine which supports a user configurable instruction set that allows flexibility in constructing search sequence and data input configurations.

Briefly, one preferred embodiment of the present invention is a search engine for comparing a data set against one or more databases. Multiple content addressable memory (CAM) modules are provided which are suitable for pre-storing the databases. Each CAM module has a module input suitable for accepting a datum, a module output suitable for providing a result, and a cascade bus suitable for interconnection with other of the CAM modules. A data dispatch unit is provided to receive the data set into the search engine, at a data input, and to process the data set into data and communicate the data to the module inputs of the CAM modules. A result dispatch unit receives the results from the module outputs of the CAM modules and process them into the comparison results and communicates those out of the search engine at a result output. To configure the search engine for this, an instruction unit receives a search instruction, at an instruction input, for configuring either or both of the data dispatch unit and result dispatch unit.

An advantage of the present invention is that it improves the performance of hardware systems employing it dramatically, since multiple search operations can take place in parallel.

Another advantage of the invention is that it is highly configurable and efficient, making it able to handle a wide variety of different database sizes.

Another advantage of the invention is that multiples of it may be cascaded together to permit even more powerful search and lookup operations.

Another advantage of the invention is that it may be user programmable, providing more power capabilities and simplifying the integration of it into larger circuits and with various other circuit components.

Another advantage of the invention is that it reduces the overall system pin count significantly, since inter-chip communication traffic is minimized.

And another advantage of the invention is that it takes reduces necessary ASIC or network processor complexity considerably in systems employing it, since multiple search operations may occur in the search engine rather than in the ASIC or network processor.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
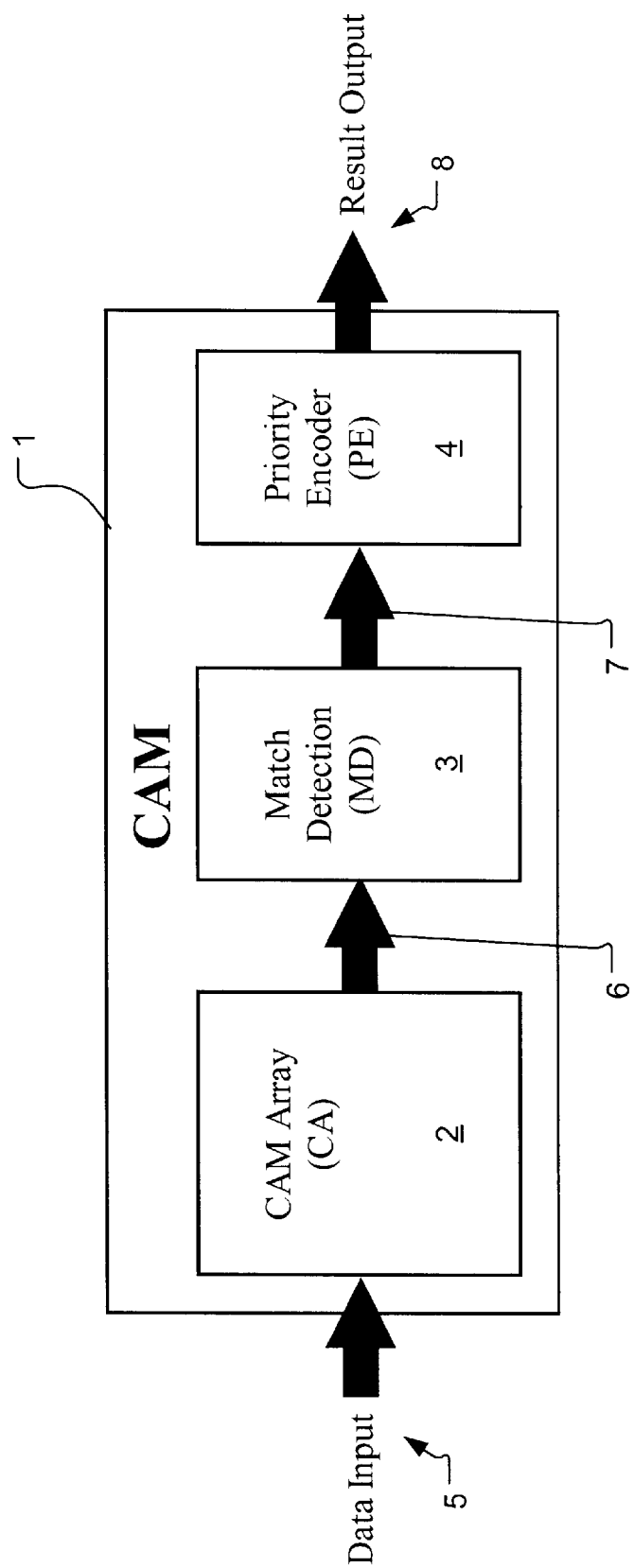
FIG. 1 (background art) is a block diagram illustrating very basic current CAM architecture.
Figure 2A:
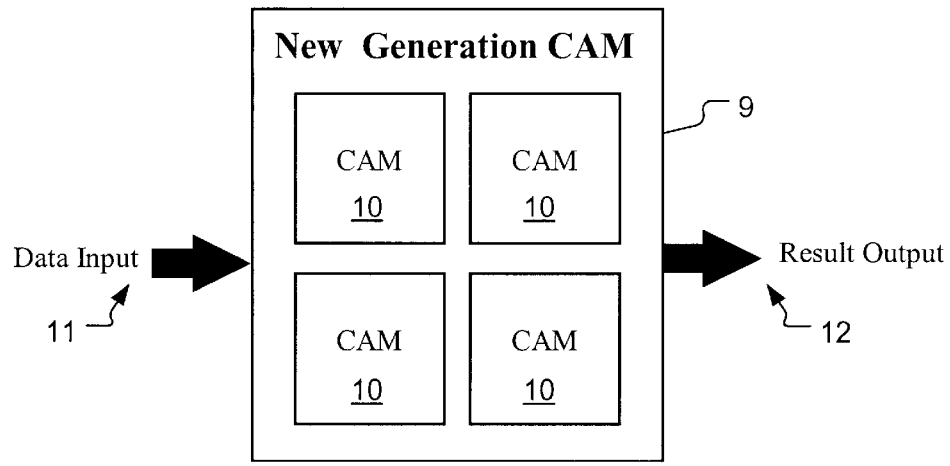
FIGS. 2a–b (background art) are block diagrams respectively illustrating a newer generation CAM having four embedded CAM modules, and three exemplary manners in which these may be configured.
Figure 2B:
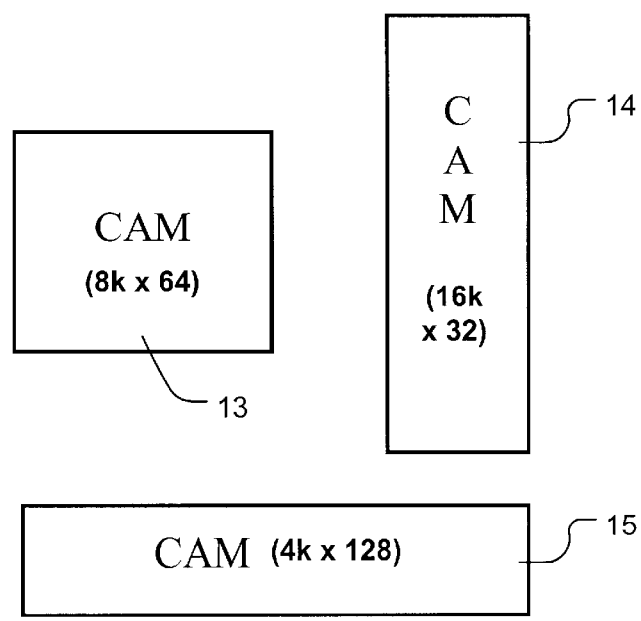

A preferred embodiment of the present invention is a scalable CAM-based search engine that accepts multiple data inputs and performs simultaneous table lookup in one clock cycle. As illustrated in the various drawings herein, and particularly in the view of FIG. 4, a preferred embodiment of the invention is depicted by the general reference character 30.

Figure 3:
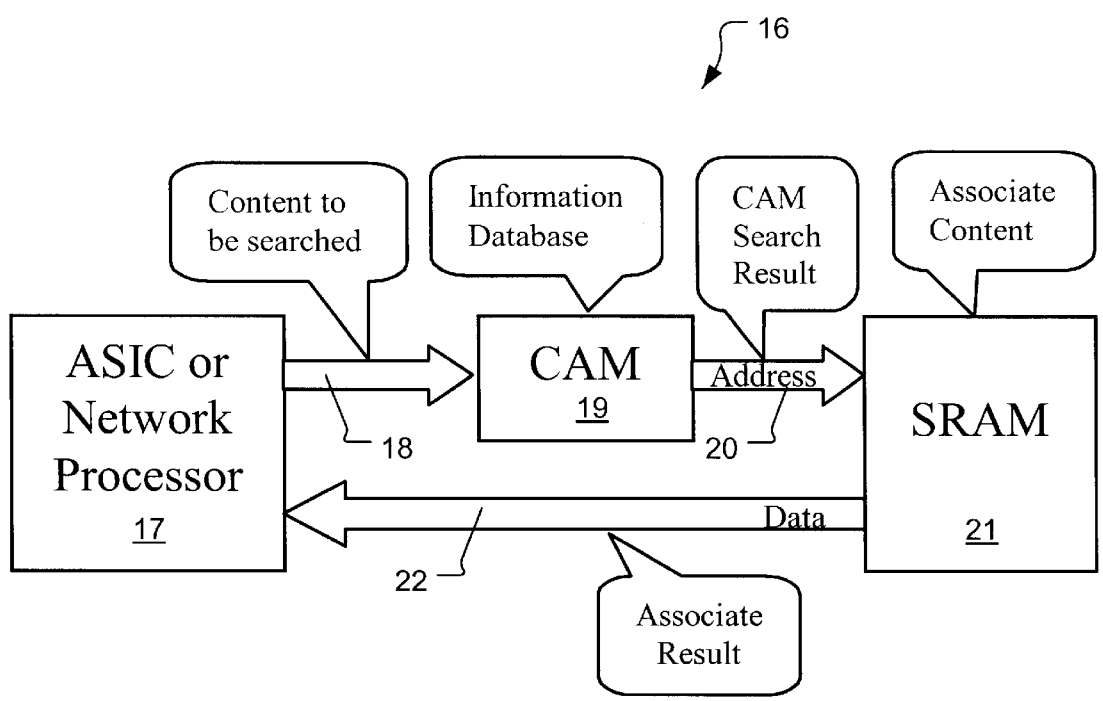
FIG. 3 (background art) is a block diagram illustrating a typical CAM-based network system.
Figure 4:
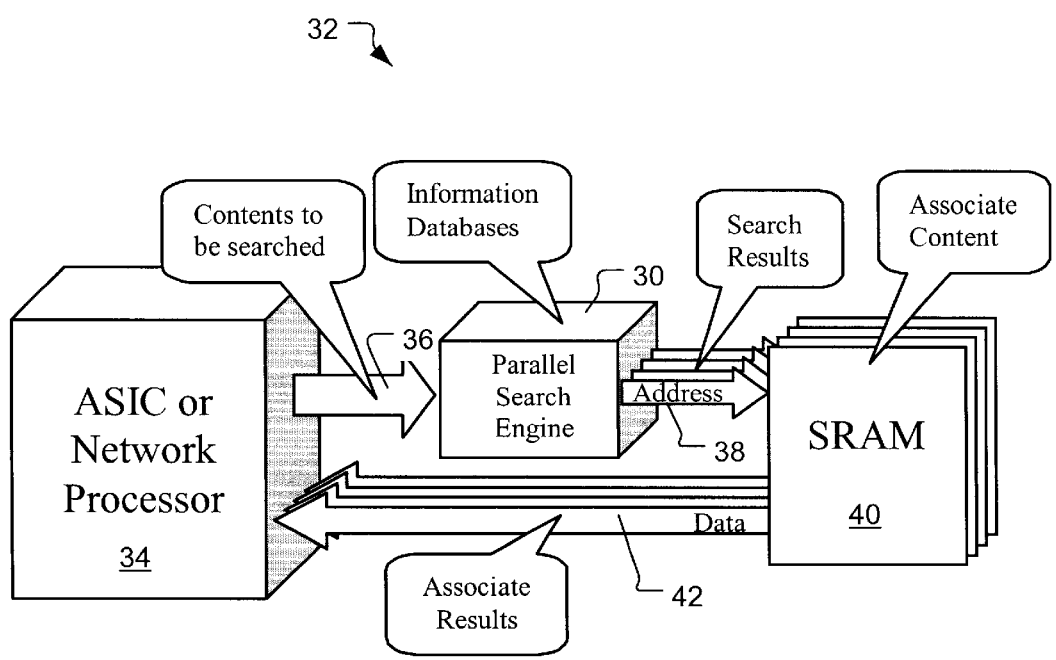
FIG. 4 is a block diagram depicting a scalable, parallel search engine according to the present invention, being utilized by a CAM-based network system.

FIG. 4 is a block diagram depicting a scalable, parallel search engine 30 according to the present invention, being utilized by a CAM-based network system 32. Much as is the case depicted in FIG. 3 (background art), of a typical network using a conventional CAM-based search engine, the CAM-based network system 32 here includes a network processor 34 which begins a search operation by moving a data set 36 (packets or other content to be searched) to the inventive parallel search engine 30. A network information database has been pre-stored in the parallel search engine 30, permitting it to produce a plurality of search results 38 which are provided to multiple memory units 40 where associate network databases have been pre-stored. A plurality of associate results 42 are then produced and travel back to the network processor 34, and the search operation is complete. This search cycle typically repeats several times for each data set 36, since multiple searches are usually required.

Figure 5:
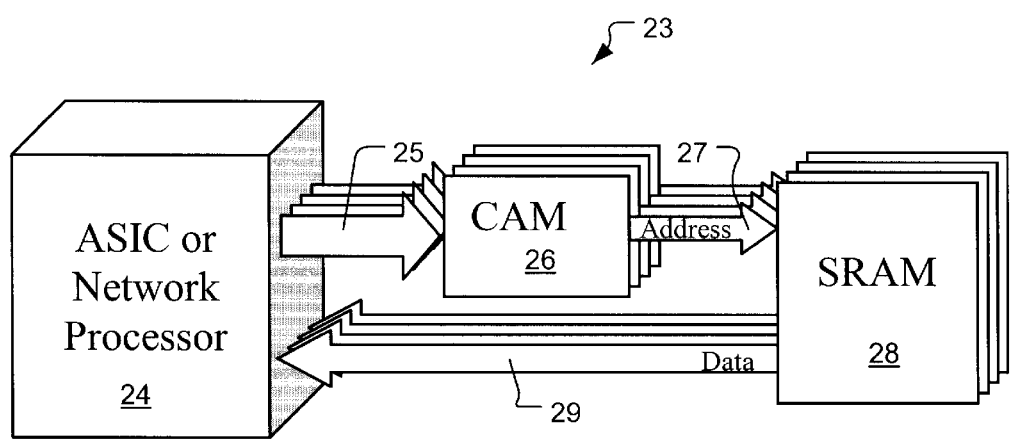
FIG. 5 (background art) is a block diagram depicting how a network system theoretically equivalent to that of FIG. 4 might be produced using prior art technology.

FIG. 5 (background art) is a block diagram depicting how a result equivalent to that of FIG. 4 could be produced using prior art technology. A CAM-based network system 23 equivalent to that of the network system 32 of FIG. 4 is the desired goal, but is necessarily somewhat different structurally. A network processor 24 here would have to pass data sets 25 in parallel (on a widened bus) to a plurality of conventional CAMs 26. A plurality of search results 27, multiple memory units 28, and a plurality of associate results 29 would then be employed, equivalent to the search results 38, memory unit 40, and associate results 42 of the network system 32 of FIG. 4.

Before proceeding with a detailed discussion of the parallel search engine 30, it is helpful to first understand some of the architectural goals which the inventor feels are important. After the discussion in the Background Art section it should be understood that the most important goal of the parallel search engine 30 is to allow multiple searches to take place concurrently during each clock cycle, without sacrificing any configuration flexibility. The architecture of the parallel search engine 30 should therefore allow key parameters to be scaled easily. These include: the number of search operations per clock cycle, the number of embedded CAM modules; the number of devices that can be cascaded to create a larger search engine; the number of search instructions; the search data input bus width; and the result output bus capacity.

To achieve all of this, the following concepts are preferably utilized. Massive numbers embedded CAM modules may be deployed, and every such module should be able to operate independently. Multiple such CAMs should be linkable together to form yet larger modules of embedded CAM. The ability is needed to take in input data and to distribute it to the appropriate embedded CAMs. An ability is similarly needed to collect and process the results from all of the embedded CAMs before outputting final results. The data distribution and result processing mechanism should also be programmable, since applications often have different requirements. And it is desirable to have the capability of combining multiple instances of the parallel search engine to form yet larger search engines.

Figure 6:
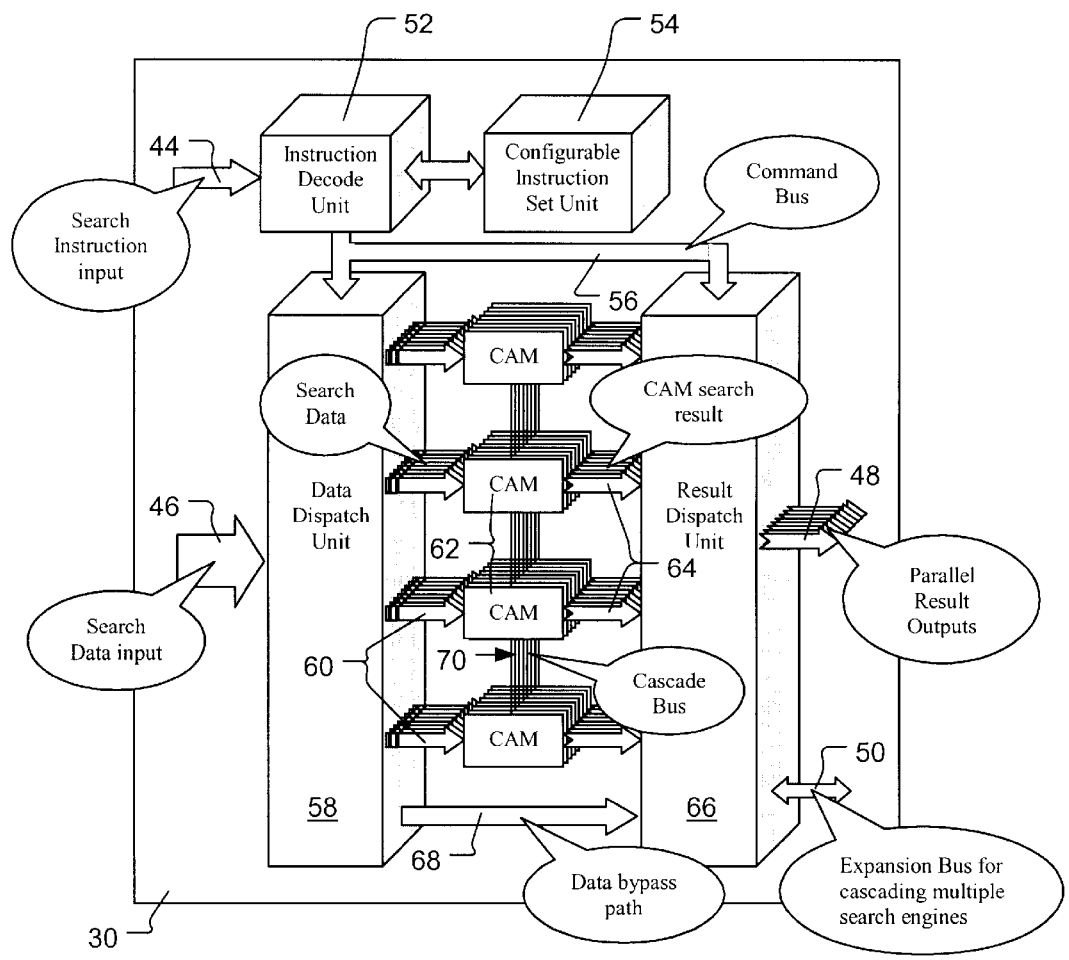
FIG. 6 is a block diagram depicting the architecture of an exemplary parallel search engine according to the present invention.

FIG. 6 is a block diagram depicting the architecture of a parallel search engine 30 according to the present invention. As can be seen, there are some fundamental differences in the parallel search engine 30 over conventional search engines. There are two inputs, a search instruction input 44 and a search data input 46. There are also two sets of outputs, including multiple result outputs 48 (provided since multiple searches generate multiple results) and an expansion bus 50 to permit cascading multiple parallel search engines 30.

The search instruction input 44 is connected to an instruction decode unit 52, which in turn communicates with a configurable instruction set unit 54, and controls the rest of the parallel search engine 30 via a command bus 56. A more detailed discussion of some of these elements is provided presently.

The search data input 46 provides input data to a data dispatch unit 58 which routes a plurality of search data 60 to a plurality of CAM modules 62. The massive number of CAM modules 62 used in the parallel search engine 30 is one reason why the invention is so powerful. The CAM modules 62 are able to operate independently and link to each other to form a wider effective CAM unit. Optionally, in response to a command at the search instruction input 44 the databases of content can be received via the search data input 46 and pre-stored in the CAM modules 62. Alternately, a conventional scheme using a separate bus (i.e., a "comparand bus") may be used for this.

The CAM modules 62 provide a plurality of search results 64 to a result dispatch unit 66. Alternately, the data dispatch unit 58 may employ a data bypass path 68, to deliver data directly to the result dispatch unit 66. Finally, the result dispatch unit 66 is connected to the result outputs 48, which permits the results to be used by a network system 32 such as that in FIG. 4, and the expansion bus 50, which permits use of the parallel search engine 30 in even more complex network systems.

Figure 7:
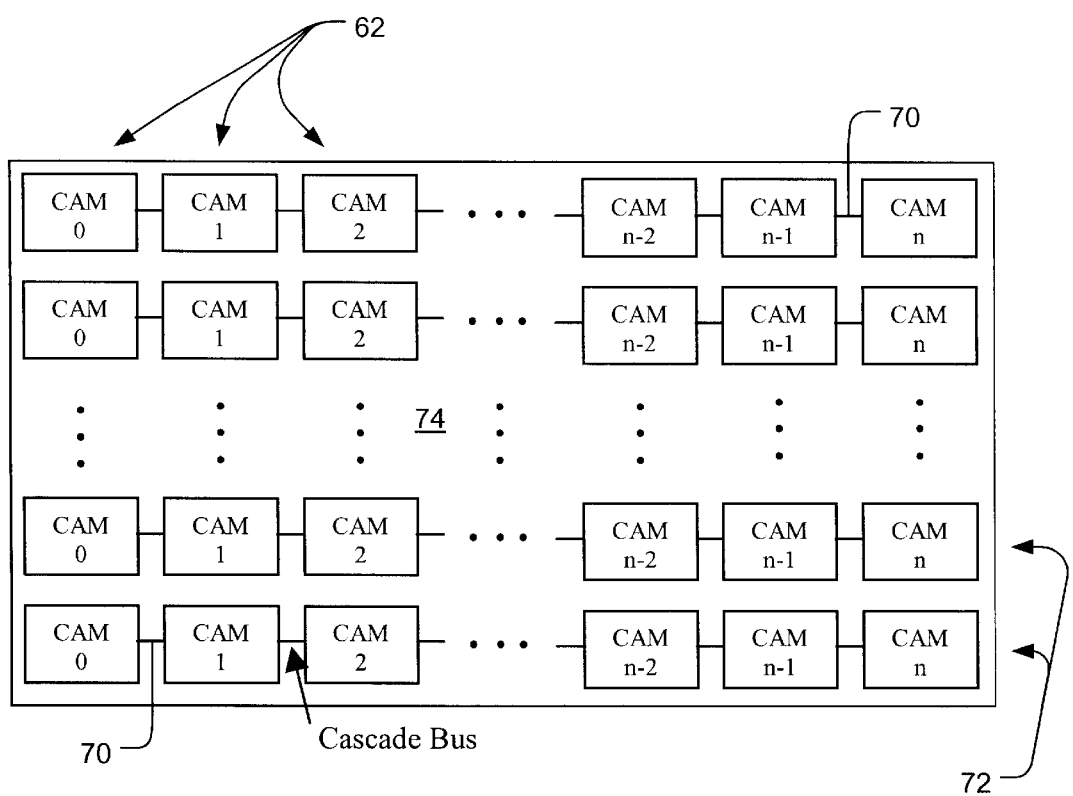
FIG. 7 is a block diagram depicting a number of CAM modules linked together by cascade information buses to form CAM arrays and make up a CAM module in the parallel search engine.

FIG. 7 is a block diagram depicting the potentially massive number of CAM modules 62 which the inventive parallel search engine 30 may employ linked together by cascade information buses 70 (also shown in FIG. 6). Sets of CAM modules 62 are linked by a cascade information bus 70 to, in turn, form wider CAM modules 72. The totality of the CAM modules 62 and cascade information buses 70 thus form a CAM module array 74. The width and depth of the CAM module array 74 is fixed. [Notice, however, that the smaller the width the CAM modules 62 are the finer the granularity that can be achieved.] By cascading several of the CAM modules 62 together, using the cascade information buses 70 to pass intermediate results, a wider CAM module 72 is produced. Deeper CAM modules can be defined by processing the search results from all of a number of actual CAM modules 62 which make up the deeper CAM modules.

Figure 8A:
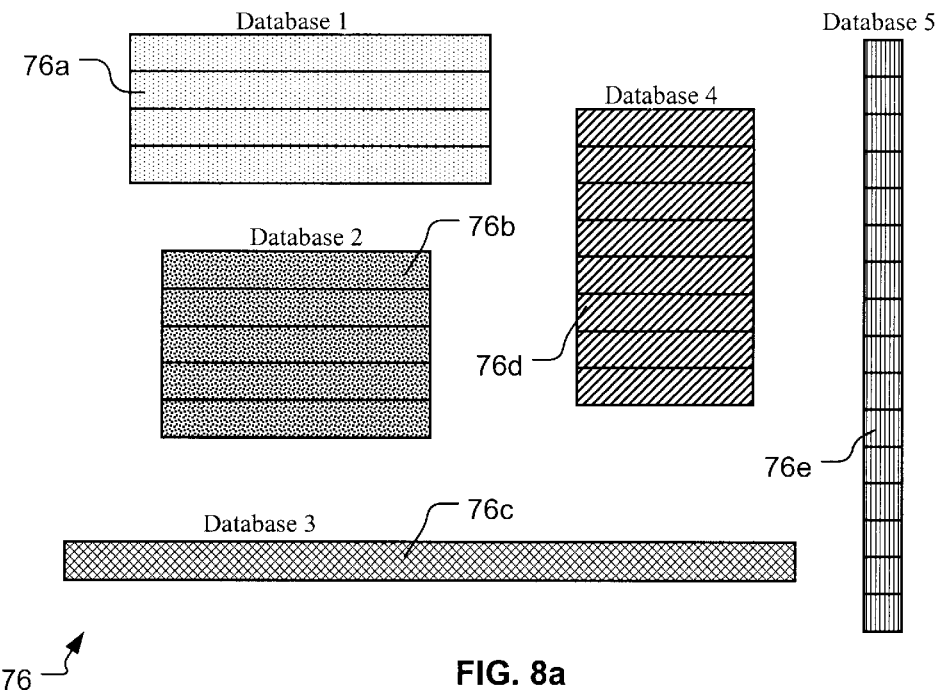
FIGS. 8a and 8b are block diagrams depicting an example of how CAM arrays of CAM modules can be configured to contain multiple different size databases.
Figure 8B:
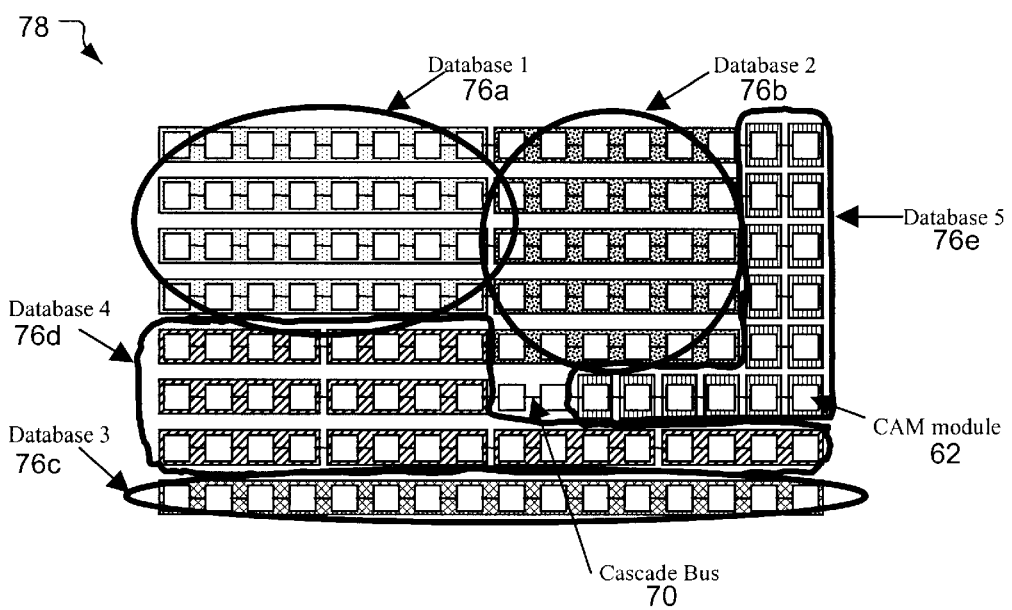

FIGS. 8a and 8b are block diagrams depicting an example of how a CAM module array 74 can be configured to contain multiple different size databases 76. The databases 76 are collections of information pre-programmed into multiple virtual CAM devices 78 inside the CAM module arrays 74 of a parallel search engine 30.

FIG. 8a shows five different databases 76 programmed into five virtual CAM devices 78. The first database 76a is 4×8 (4 CAM modules deep and 8 CAM modules wide), the second database 76b is 5×6, the third database 76c is ×16, the fourth database 76d is 8×4, and the fifth database 76e is 16×1. FIG. 8b shows how the databases 76 may be constructed using the CAM modules 62. Assuming that there are 128 such CAM modules 62 present (making a total size of 8×16), one possible way to fit the databases 76 into the parallel search engine 30 is shown.

The CAM modules 62 inside the parallel search engine 30 are grouped to create the five virtual CAM devices 78, one for each database 76. Each virtual CAM device 78 is made up of one or more of the wider CAM modules 72 (except the fifth database 76e, which doesn't need wider CAM modules since it is only one unit wide). The first database 76a has four such wider CAM modules 72, the second database 76b has five, the third database 76c has one, and the fourth database 76d has eight. The fifth database 76e has sixteen CAM modules 62.

Since each wider CAM module 72 is further made up of multiple CAM modules 62, all of the CAM modules 62 within a wider CAM module 72 must be on the same row to be linked together by a cascade information bus 70. Configuring multiple independent virtual CAM devices 78 inside the parallel search engine 30 is thus flexible and easy.

The next concern is defining the operations that are needed for using the different databases 76. This is necessary because the parallel search engine 30 is capable of executing multiple searches at the same time but without necessarily involving every database 76 in each operation.

Figure 9A:
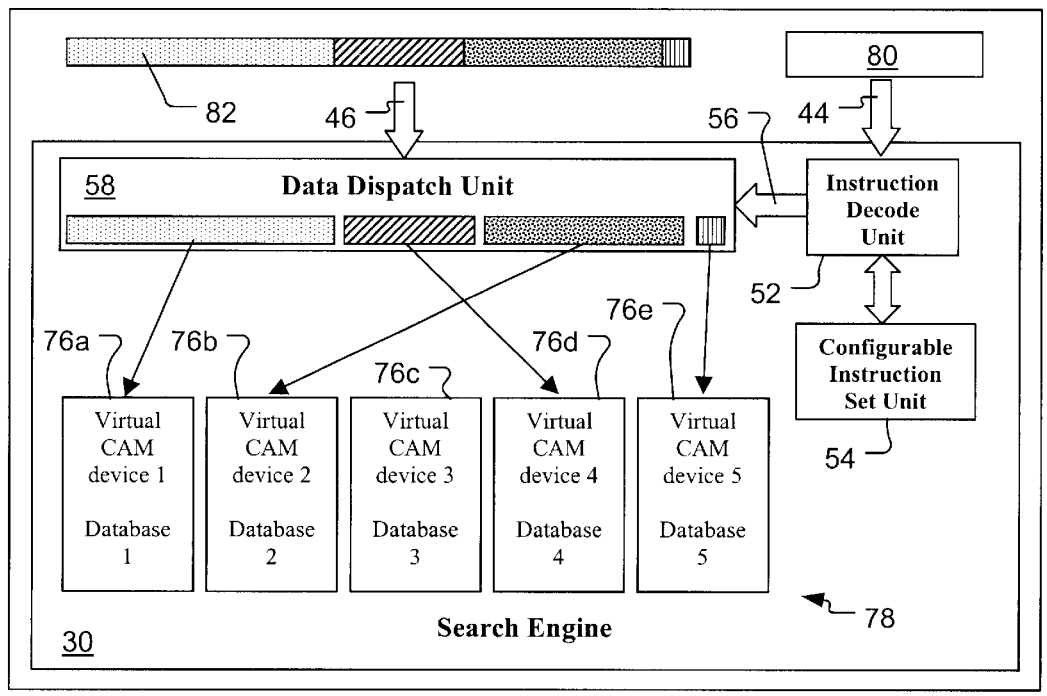
FIGS. 9a–b depict by example how a first search operation and a second may search operation engage different databases.
Figure 9B:
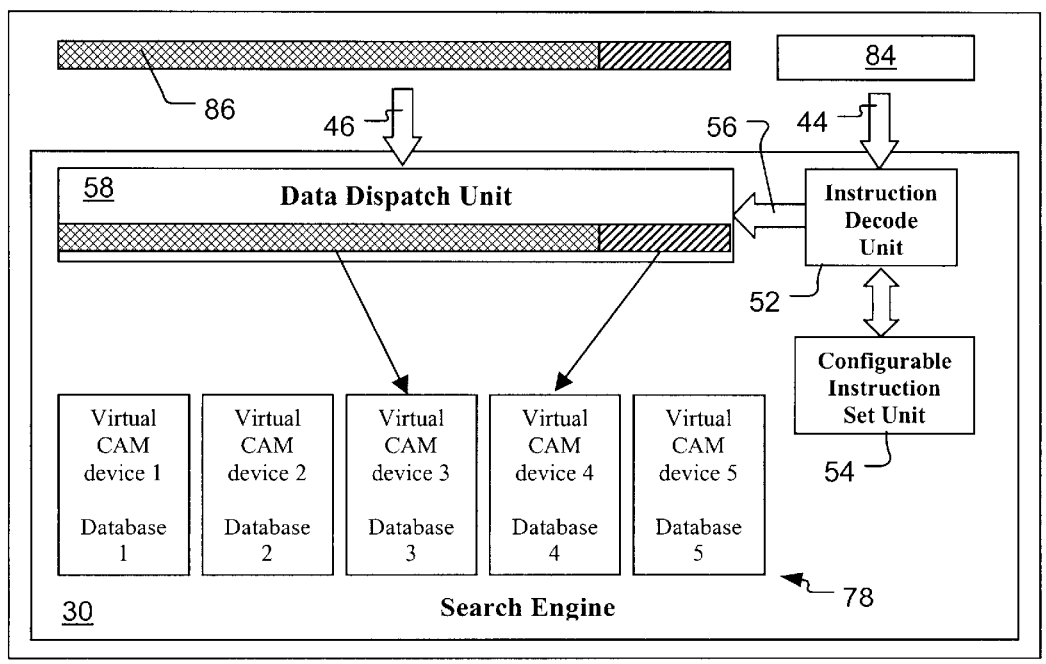

FIGS. 9a–b depict by example (with reference to FIG. 6 also useful here) how a first search operation may engage the first database 76a, second database 76b, the fourth database 76d, and the fifth database 76e (but not the third database 76c); while a second search operation may engage just the third database 76c and the fourth database 76d.

The definitions of search operations are pre-stored inside the configurable instruction set unit 54. In FIG. 9a the instruction decode unit 52 receives a first search instruction 80, via the search instruction input 44, and retrieves corresponding command information from the configurable instruction set unit 54. In FIG. 9b the instruction decode unit 52 receives a second search instruction 84 and retrieves corresponding command information from the configurable instruction set unit 54 for it.

In FIG. 9a a complex data set including multiple datum or data as a first search data set 82. Distinctive hatching represents which of the respective databases 76 (pre-stored in the five virtual CAM devices 78) the respective data will be compared against. The data dispatch unit 58 gets the first search data set 82, via the search data input 46, and dispatches it to the appropriate virtual CAM devices 78 in the parallel search engine 30 based on the command received from instruction decode unit 52. The first search instruction 80 is received by the instruction decode unit 52, via the command bus 56, and controls operation of the data dispatch unit 58 and the result dispatch unit 66 (FIG. 6).

In FIG. 9b a different complex data set as a second search data set 86 is provided, and distinctive hatching again represents which of the databases 76 the respective data will be compared against. Rather than perform a search operation using four of the databases 76, as was the case in FIG. 9a, a search operation is now performed using just of two of the databases 76. The second search instruction 84 is received by the instruction decode unit 52 and controls this.

The function of the result dispatch unit 66 is to gather the results from every one of the virtual CAM devices 78, process those results according to a command from the instruction decode unit 52, and to dispatch that result elsewhere for ultimate use.

The command information from the instruction decode unit 52 specifies the configuration of the CAM modules 62.The result dispatch unit 66 uses this information to find out which of the CAM modules 62 belong to which wider CAM modules 72 and virtual CAM devices 78, and to then extract the correct result from all of the search results before dispatching a final result.

With reference briefly to FIG. 4 as well as FIG. 6, the data bypass path 68 from the data dispatch unit 58 to the result dispatch unit 66 is provided because an external network processor 34 may want to simply bypass the parallel search engine 30 and control the external memory unit 40 directly.

Figure 10:
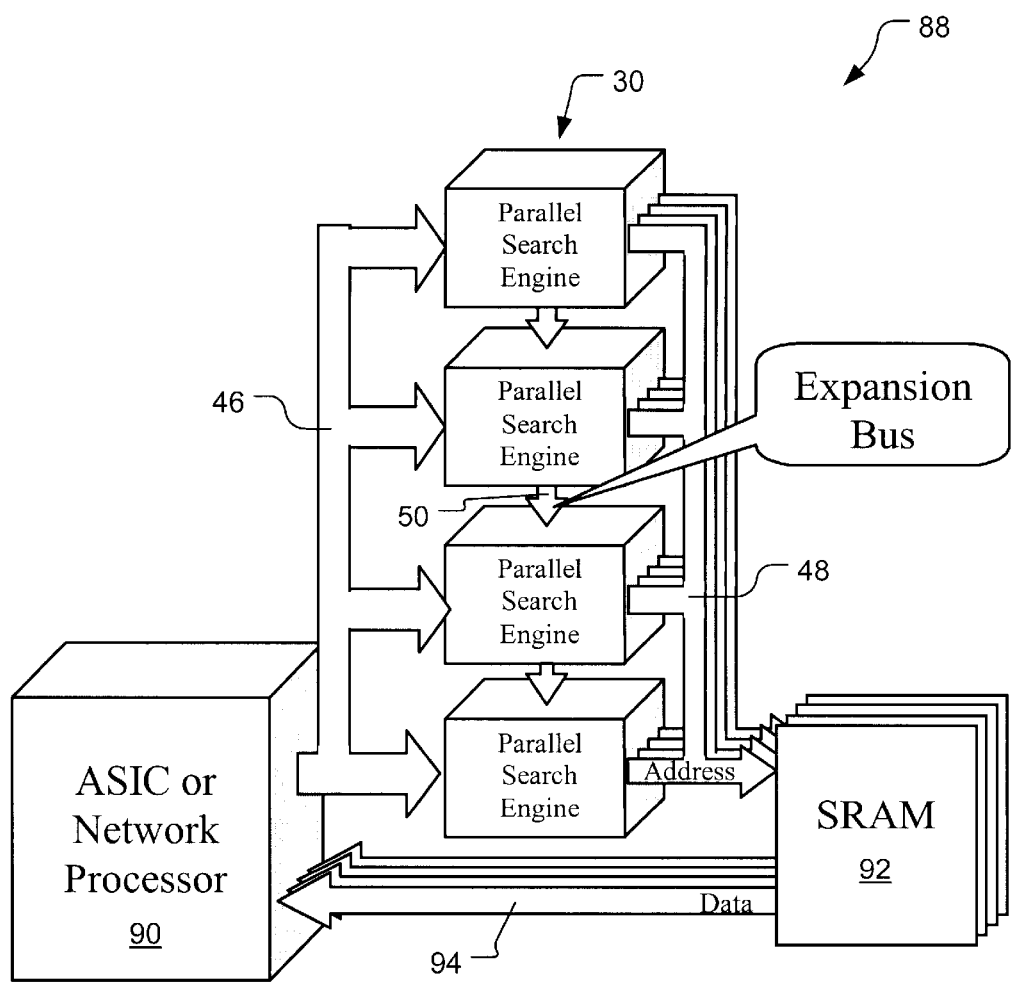
FIG. 10 is a block diagram illustrating how multiple instances of the parallel search engine can be cascaded together to create a yet larger mega search engine.

FIG. 10 is a block diagram illustrating how multiple instances of the parallel search engine 30 can be cascaded together to create a yet larger mega search engine 88. Since typical databases today are often large enough that they need to be spread across several different search engines, multiple instances of the inventive parallel search engine 30 may be cascaded together. A network processor 90 can provide input data to a plurality of parallel search engines 30 on their search data inputs 46. The parallel search engines 30 are connected as shown by their expansion buses 50, with a cascade output from one connected to a cascade input of another. If a match is found or not found by one parallel search engine 30 it may thus communicate that fact to the others in the mega search engine 88. The parallel search engines 30 provide results on their result outputs 48 to memory units 92. Finally, the memory units 92 provide associate results 94 back to the network processor 90.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present parallel search engine 30 is well suited for application in hardware-based search and lookup operations. It has a scalable architecture which particularly enables parallelism in content search across multiple databases, yet which allows finer control internal CAM resources and provides for programmability.

The parallel search engine 30 is very powerful in its ability to handle operations on multiple, large databases. Yet it is also very efficient because it may do this concurrently, in parallel. For example, it has been the inventor's observation that network system related search and lookup tasks often share common input data but take place on different independent databases. The use of a user configurable instruction set allows unlimited flexibility in constructing search sequences and data input configurations. Furthermore, even when a task is too big for a particular single instance of the parallel search engine 30, multiple instances of it may be cascaded together to provide sufficient capability for the task.

The parallel search engine 30 may also provide considerable peripheral benefits in hardware employing it. Its highly powerful internal capabilities reduce the need for external connection and control. This may reduce total system pin counts and simplify the external circuitry which is used. For example, by allowing multiple operations to be performed concurrently the inbound communication traffic is considerably reduced. The option of a user configurable instruction set also allows simplifies external connection and control. The parallel search engine 30 to be easily incorporated in larger circuits, yet also flexibly work with requirements or preferences of those circuits. Additional circuitry for "translation" or "glue" functionality can thus be avoided. Of course, related "footprint," cost, and power utilization advantages are also provided by this.

To implement a system with the same level of performance as parallel search engine 30 using a prior art system architecture would require more components and complexity. The number of CAM device would have to be increased to achieve such performance and the data bus going from the ASIC or network processor to the CAM would have to be widen significantly to support the data traffic.

The parallel search engine 30 is extremely well suited for use in network system hardware. Currently network hardware capability is severely taxed, yet there is not end in sight to the demand for faster, more powerful network hardware. Some simple examples illustrate this. In considerably less than ten years we have seen the astounding growth from mere hundreds to many millions of online web pages. Concurrently, we have seen the exponentially rapid progression from 10 megabytes, to 100 megabytes, to 1 gigabytes in even a "standard" protocol such as Ethernet. Yet, the pace of such change is not slowing. Rather it is accelerating and the demand for capacity is concurrently also increasing, due to the merger of essentially all communication into networks and the growing adoption of portable computing, entertainment and communications appliances.

Other industries which may beneficially adopt the parallel search engine 30 are also seeing capability demand and growth. Some ready examples include cryptography, audio, and graphics processing, where pattern recognition and matching are often important.

For the above, and other, reasons, it is expected that the parallel search engine 30 of the present invention will have widespread industrial applicability. Therefore, it is expected that the commercial utility of the present invention will be extensive and long lasting.

What is claimed is:

1. A search engine for comparing a data set against at least one database, comprising:

a plurality of content addressable memory (CAM) modules suitable for pre-storing the at least one database, wherein each said CAM module has a module input suitable for accepting a datum, a module output suitable for providing a result, and a cascade bus suitable for interconnection with other said CAM modules;

a data dispatch unit to receive the data set into the search engine at a data input and process the data set into data and communicate said data to said module inputs of said CAM modules;

a result dispatch unit to receive said results from said module outputs of said CAM modules and process said results into said comparison results and communicate said comparison results out of the search engine at a result output; and an instruction unit to receive a search instruction into the search engine at an instruction input and configure at least one of said data dispatch unit and said result dispatch unit in response to said search instruction wherein:

said instruction unit includes an instruction set unit suitable for storing commands for search operations which the search engine can perform in association with particular said search instructions;

said instruction unit further includes an instruction decode unit suitable for selectively configuring said data dispatch unit and said result dispatch unit in response to said commands, and said instruction unit is selectively programmable with said commands.

2. The search engine of claim 1, wherein instances of the data set may include a plurality of data words and said data dispatch unit is suitable for receiving said data words in parallel.

3. The search engine of claim 1, wherein said result dispatch unit is suitable for transmitting said comparison results in parallel when more than one said comparison result is present.

4. The search engine of claim 1, wherein said data dispatch unit includes a conventional comparand bus for receiving the at least one database into the search engine.

5. The search engine of claim 1, wherein said data dispatch unit is suitable for pre-storing the at least one database into said plurality of CAM modules in response to at least one particular said search instruction.

6. The search engine of claim 1, wherein said data dispatch unit is suitable for receiving the at least one database into the search engine via said data input and pre-storing the at least one database into said plurality of CAM modules in parallel.

7. The search engine of claim 1, wherein said data dispatch unit is suitable for receiving a plurality of the at least one database via said data input and concurrently storing said plurality of the at least one database into said plurality of CAM modules in parallel in response to at least one particular said search instruction.

8. The search engine of claim 1, further comprising a data bypass between said data dispatch unit and said result dispatch unit, to permit communication of at least part of said data from said data dispatch unit to said result dispatch unit without processing by said CAM modules.

9. The search engine of claim 8, wherein said data dispatch unit selectively employs said data bypass in response to said search instruction.

10. The search engine of claim 1, further comprising an expansion bus suitable for interconnecting multiple instances of the search engine together to from a mega search engine.

11. A method for comparing a data set against at least one database, the method comprising the steps of:

(a) programming a search engine to operate in manners associated with particular instances of search instructions;

(b) receiving a said search instruction into said search engine;

(c) configuring said search engine in response to said search instruction;

(d) receiving the data set to be compared into said search engine;

(e) processing the data set into a plurality of data and transmitting said data in parallel to a plurality of content addressable memory (CAM) modules in which the at least one database have been pre-stored;

(f) comparing said data and the at least one database in said CAM modules to produce a plurality of results; and (g) receiving said plurality of results from said CAM modules and processing said results in parallel into at least one comparison result.

12. The method of claim 11, wherein said step (f) includes communicating intermediate results between cascade-connected instances of said CAM modules.

13. The method of claim 11, further comprising prior to said step (e), storing the at least one database into said CAM modules.

14. The method of claim 11 wherein:

said step (e) includes processing and transmitting a portion of said data to bypass said CAM modules; and said step (g) includes receiving and processing said portion of said data also into said comparison results.

15. The method of claim 11, further comprising cascading a plurality of said search engines together to form a mega search engine, wherein respective said search engines intercommunicate search status information via cascade-inputs and cascade-outputs to generate mega comparison results.

16. A search engine for comparing a data set against at least one database, comprising:

a plurality of content addressable memory (CAM) modules suitable for pre-storing the at least one database, wherein each said CAM module has a module input suitable for accepting a datum, a module output suitable for providing a result, and a cascade bus suitable for interconnection with other said CAM modules;

a data dispatch unit to receive the data set into the search engine at a data input and process the data set into data and communicate said data to said module inputs of said CAM modules;

a result dispatch unit to receive said results from said module outputs of said CAM modules and process said results into said comparison results and communicate said comparison results out of the search engine at a result output; and an instruction unit to receive a search instruction into the search engine at an instruction input and configure at least one of said data dispatch unit and said result dispatch unit in response to said search instruction, wherein:

said instruction unit includes an instruction set unit suitable for storing commands for search operations which the search engine can perform in association with particular said search instructions;

said instruction unit further includes an instruction decode unit suitable for selectively configuring said data dispatch unit and said result dispatch unit in response to said commands; and said instruction unit is selectively programmable with said commands.

17. A search engine for comparing a data set against at least one database, comprising:

a plurality of content addressable memory (CAM) modules suitable for pre-storing the at least one database, wherein each said CAM module has a module input suitable for accepting a datum, a module output suitable for providing a result, and a cascade bus suitable for interconnection with other said CAM modules;

a data dispatch unit to receive the data set into the search engine at a data input and process the data set into data and communicate said data to said module inputs of said CAM modules, wherein said data dispatch unit is suitable for receiving the at least one database into the search engine via said data input and pre-storing the at least one database into said plurality of CAM modules in parallel;

a result dispatch unit to receive said results from said module outputs of said CAM modules and process said results into said comparison results and communicate said comparison results out of the search engine at a result output; and an instruction unit to receive a search instruction into the search engine at an instruction input and configure at least one of said data dispatch unit and said result dispatch unit in response to said search instruction.

18. A search engine for comparing a data set against at least one database, comprising:

a plurality of content addressable memory (CAM) modules suitable for pre-storing the at least one database, wherein each said CAM module has a module input suitable for accepting a datum, a module output suitable for providing a result, and a cascade bus suitable for interconnection with other said CAM modules;

a data dispatch unit to receive the data set into the search engine at a data input and process the data set into data and communicate said data to said module inputs of said CAM modules, wherein said data dispatch unit is suitable for receiving a plurality of the at least one database via said data input and concurrently storing said plurality of the at least one database into said plurality of CAM modules in parallel in response to at least one particular said search instruction;

a result dispatch unit to receive said results from said module outputs of said CAM modules and process said results into said comparison results and communicate said comparison results out of the search engine at a result output; and an instruction unit to receive a search instruction into the search engine at an instruction input and configure at least one of said data dispatch unit and said result dispatch unit in response to said search instruction.

19. A search engine for comparing a data set against at least one database, comprising:

a plurality of content addressable memory (CAM) modules suitable for pre-storing the at least one database, wherein each said CAM module has a module input suitable for accepting a datum, a module output suitable for providing a result, and a cascade bus suitable for interconnection with other said CAM modules;

a data dispatch unit to receive the data set into the search engine at a data input and process the data set into data and communicate said data to said module inputs of said CAM modules;

a result dispatch unit to receive said results from said module outputs of said CAM modules and process said results into said comparison results and communicate said comparison results out of the search engine at a result output;

an instruction unit to receive a search instruction into the search engine at an instruction input and configure at least one of said data dispatch unit and said result dispatch unit in response to said search instruction; and a data bypass between said data dispatch unit and said result dispatch unit, to permit communication of at least part of said data from said data dispatch unit to said result dispatch unit without processing by said CAM modules, wherein said data dispatch unit selectively employs said data bypass in response to said search instruction.

20. A search engine for comparing a data set against at least one database, comprising:

a plurality of content addressable memory (CAM) modules suitable for pre-storing the at least one database, wherein each said CAM module has a module input suitable for accepting a datum, a module output suitable for providing a result, and a cascade bus suitable for interconnection with other said CAM modules;

a data dispatch unit to receive the data set into the search engine at a data input and process the data set into data and communicate said data to said module inputs of said CAM modules;

a result dispatch unit to receive said results from said module outputs of said CAM modules and process said results into said comparison results and communicate said comparison results out of the search engine at a result output;

an instruction unit to receive a search instruction into the search engine at an instruction input and configure at least one of said data dispatch unit and said result dispatch unit in response to said search instruction; and an expansion bus suitable for interconnecting multiple instances of the search engine together to from a mega search engine.

21. A method for comparing a data set against at least one database, the method comprising the steps of:

(a) receiving a search instruction into a search engine;

(b) configuring said search engine in response to said search instruction;

(c) receiving the data set to be compared into said search engine;

(d) processing the data set into a plurality of data and transmitting said data in parallel to a plurality of content addressable memory (CAM) modules in which the at least one database have been pre-stored;

(e) comparing said data and the at least one database in said CAM modules to produce a plurality of results;

(f) receiving said plurality of results from said CAM modules and processing said results in parallel into at least one comparison result; and (g) cascading a plurality of said search engines together to form a mega search engine, wherein respective said search engines intercommunicate search status information via cascade-inputs and cascade-outputs to generate mega comparison results.

* * * * *